United States Patent [19]

Mansukhani

[11] 4,177,075
[45] Dec. 4, 1979

[54] JET PRINTING INK CONTAINING AMMONIUM FORMATE ELECTROLYTE

[75] Inventor: Ishwar R. Mansukhani, Neenah, Wis.

[73] Assignee: M&T Chemicals Inc., Stamford, Conn.

[21] Appl. No.: 912,227

[22] Filed: Jun. 5, 1978

[51] Int. Cl.$^2$ .............................................. C09D 11/08
[52] U.S. Cl. ...................................... 106/30; 106/20; 106/22; 106/23
[58] Field of Search ........................ 106/30, 22, 23, 20

[56] References Cited

U.S. PATENT DOCUMENTS 4,021,252   5/1977   Banczak ................................ 106/30

Primary Examiner—Carman J. Seccuro
Attorney, Agent, or Firm—Kenneth G. Wheeless; Robert Spector

[57] ABSTRACT

In an ink composition suitable for ink jet printing on metal surfaces, the ink incorporating, in solution, a colorant, a resin component, an alcohol-water solvent and optionally an electrolyte, proportioned to give the ink properties of low surface tension, low viscosity and a low resistivity, the improvement comprising the presence of ammonium formate as an electrolyte thereby preventing color degradation or mutation.

2 Claims, No Drawings

JET PRINTING INK CONTAINING AMMONIUM FORMATE ELECTROLYTE

BACKGROUND OF THE INVENTION

The jet printing inks of the prior art undergo color degradation or mutation. This invention prevents color degradation or mutation of jet printing inks.

Ink jet printing is a recent development in the art of applying identifying and decorative indicia to a base. In general terms, a fluid ink is forced, under pressure, through a very small orifice in an orifice block which contains a piezoelectric crystal vibrating at high frequency (50–100,00 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to infringe on the base medium which is to receive the decorative or informative printed indicia. Apparatus suitable for carrying out the ink jet printing process is described in detail in U.S. Pat. Nos. 3,465,350 and 3,465,351, issued Sept. 2, 1969, and it is in connection with an apparatus and process such as are described in the aforementioned patents that the ink of the present invention is designed to function.

DESCRIPTION OF THE PREFERRED EMBODIMENT

The inks of this invention contain a dye, a solvent blend, a resinous component and ammonium formate as electrolyte in an amount effective to achieve desired drop deflection characteristics, all of which must be in carefully balanced proportion to achieve successful operation of the ink in a jet printing apparatus. The ammonium formate electrolyte component may be added in an amount which will be effective in lowering the specific resistivity of a given ink to the desired level. The effective amount of electrolyte will vary from zero to 2 or 3% or higher, depending on the original resistivity of the ink and on the resistivity desired.

The Solvent Blend

Although minor amounts of other solvents may be included in the overall ink composition for specific purposes, the primary solvent blend is a mixture of one or more of the lower aliphatic alcohols previously mentioned and water, in such proportions that the surface tension of the ink is less than about 40 dyne cms., measured at 68° F. For printing on the surface of aluminum metal, the weight ratio of water to the alcoholic component should be in the range between 1 to 1.5 and 1 to 5, the preferred, or optimum ratio, being about 1 to 3, since this ratio yields inks having surface tensions of about 30–35 dyne cms. If the solvent blend contains a higher than desired concentration of water, the resulting ink will tend to bead up on the metal surface, whereas a particularly high concentration of the alcohol causes the ink to spread unduly on the metal surface with resultant smearing or diffusion of the printed indicia. Since the wetting characteristics of steel and tin plated steel vary somewhat from those of aluminum, when these metals are the substrate on which the printing is to be applied, the solvent ratio must be adjusted somewhat, a suitable water-to-alcohol ration being from 1 to 3 to about 1 to 10, with a ratio of about 1 to 8 being preferred, yielding inks in the desired surface tension range of 22–30 dyne cms.

In addition to methanol and water, the solvent blend in the preferred ink compositions often contains some ethanol, used as the primary solvent for the resinous component. As previously stated, ethyl alcohol and the propyl alcohols have higher viscosities than methyl alcohol and the viscosity of a particular ink composition will, of course, vary substantially depending on which of these alcohols are incorporated and in what proportions. The choice of the alcoholic component will depend on the specific characteristics desired in the final ink. If rapid drying and/or very low viscosity are required, the alcoholic component will necessarily be primarily methyl alcohol. If slower drying and a somewhat higher viscosity may be tolerated in a given situation, part or all of the methyl alcohol may be replaced with ethyl, n-propyl or isopropyl alcohol. Compositions employing these less volatile alcohols require less make-up solvent addition and are less subject to line plugging problems associated with rapid evaporation of the ink solvents. In general, inks of very low viscosity, particularly below about 3 cps. at 68° F., are preferred, although inks of about 5 cps. at 68° F. may be used very satisfactorily and, in extreme cases in which high driving pressure and relatively large nozzle orifice size (0.005 inch, for example) are employed, inks approaching a viscosity of 8–10 cps. at 68° F. may be used.

In each ink composition, the particular alcoholic component used must be in balanced proportion to the amount of water present in the ink, the proportions being within the limits previously set forth for satisfactory operation.

A small amount of ammonia or similar alkalizing agent, in the form of a concentrated aqueous solution, is added to the ink to maintain the system in the pH range of 8.0 to 9.5. The preferred pH range of 8.6 to 8.8 is generally maintained by addition of about 1% by weight of concentrated ammonia solution (26° Baume) to the ink, but it is to be understood that the amount of this component or an equivalent substitute which is added may be varied in accordance with the pH requirements set forth above.

Control of the pH of the ink composition is important to the success of the ink in jet printing operations. Alkalinity in excess of that indicated by the stated pH range results in slow drying of the ink on a printed surface and relatively poor adhesion, whereas a pH below the acceptable range may seriously affect the stability of composition, causing sludging in the system and plugging of the printing jet orifices.

If the desired dye or pigment has a relatively limited solubility in the solvent media hereinbefore described, the composition may be modified by the inclusion of a moderate amount of an additional solvent in which the dye has a high solubility, which has a low surface tension and low viscosity, which is completely miscible with water and which has a suitable evaporation rate. Certain of the relatively low molecular weight glycol ethers, including ethylene glycol monomethyl ether (commonly known as methyl cellosolve), ethylene glycol monoethyl ether (commonly known as cellosolve), propylene glycol monomethyl ether and propylene glycol monoethyl ether, have proven to be eminently satisfactory in this regard and may be added to the ink composition in amounts up to about 30% by weight, as required to stabilize the coloring agent in solution. Amounts of the listed glycol ethers in excess of 30% by weight of the composition are to be avoided if the ink is to wet the surface of the metal printing substrate satisfactorily.

The Resin Component

The preferred resin component is dewaxed and bleached shellac, or its equivalent, although any comparable resin having the requisite properties of solubility in the solvent medium and ability to anchor the color component on the metal surface could be satisfactorily utilized in the ink. In general, a high concentration of resin is desired in order to anchor the dye or pigment most firmly on the printed surface. The resin concentration, however, is limited by the increase in viscosity which results as the amount of resin in the composition increases.

Further, as the concentration of shellac-type resin increases, interaction between the resin and the coloring component may occur with resultant scumming or sludging of the ink. This phenomenon is particularly evident in those compositions which include substantial amounts of water. The problem cannot be overcome by elimination of the aqueous component, however, because some water is necessary in order to maintain the surface tension of the ink within the operative range to achieve proper wetting of the substrate. If the alcoholic component is primarily methyl alcohol, the ink may contain from about 1% to about 17% shellac, which provides effective pigment anchoring capacity within the preferred operative range of 1.75–5 cps. in overall ink viscosity heretofore mentioned in connection with nozzle orifices of about 0.003 inch in diameter. Somewhat higher shellac contents may be tolerated if the orifice size is increased proportionately as the viscosity increases due to the higher resin content. Thus, with orifices of about 0.005 inch in diameter, the shellac content may be as high as about 25% by weight, it being understood that, in inks of the higher shellac contents, the amount of water and of the higher alcohols will be maintained at a minimum compatible with the requirements of substrate wettability, drying speed and sludge prevention previously mentioned.

It has previously been noted that the use of ethyl and propyl alcohols results in inks of higher viscosity than is obtained when methyl alcohol is the primary alcoholic solvent. Since an increase in the resinous component also tends to increase the viscosity, it will be apparent that, in order to maintain a desired viscosity level, less shellac will be utilized with propyl alcohol than with methyl alcohol as the solvent. For example, an ink composition containing, by weight,
  2% rhodamine dye
  3% ammonia
  9.5% shellac
  9.5% ethyl alcohol
  19% distilled water
  58% isopropyl alcohol
had a viscosity at 68° F. of 5.2 cps. A similar viscosity was obtained by substituting methyl alcohol for the isopropyl alcohol and raising the shellac content to 17%. When ethyl alcohol was the sole alcoholic component, a viscosity of 5 cps. was obtained at a shellac content of 14%.

The Coloring Component

For satisfactory operation of the ink in jet printing apparatus, the coloring material must be in complete solution in the solvent medium. For this reason, only dyes which have sufficient solubility in water-methanol mixtures to give the desired color intensity are satisfactory for use in this invention. Dyes of the so-called basic type, including rhodamine, methyl violet, crystal violet, chrysoidine, auramine and Victoria blue, for example, have been found satisfactory for incorporation in the inks of this invention, and may be utilized in concentrations varying in accordance with the depth of color desired, within the solubility limits of the particular dye, of course. If desired, a moderate amount of a solubilizing aid for the dye, such as a low molecular weight glycol ether, may be incorporated, if needed, to stabilize the dye solution in the ink composition. The basic dyes, rhodamine and methyl violet, for example, may be incorporated as the coloring agent in any amounts up to about 5% by weight of the ink, although 2 to 3% of either of these colorants is generally considered to give quite adequate color depth and higher percentages are therefore economically undesirable. Victoria blue may be utilized in amounts from about 0.5% up to its solubility limit for stable inks of about 1.5% by weight of ink if the solvent blend comprises principally a lower aliphatic alcohol and water. Addition of 20% by weight of a glycol ether of low molecular weight, such as a monomethyl or monoethyl ether of either ethylene glycol or propylene glycol, will increase the tolerance of the ink for Victoria blue dye up to about 2.5% without loss of stability against sludging or precipitation, and lesser amounts of any of the listed solubilizing solvents will increase the colorant solubility by expectedly lesser amounts.

The following example is illustrative of ink compositions according to this invention which are effective in jet printing operations:

EXAMPLE

|  | Parts By Weight |
| --- | --- |
| Shellac | 13.80 |
| Methanol | 168.00 |
| Solox | 32.50 |
| Methylcellosolve | 63.00 |
| Victoria Pure Blue FGA | 2.60 |
| Ammonia | 2.70 |
| Ammonium Formate | 4.40 |
| Distilled Water | 63.00 |
|  | 350.00 |

No color change is observed with above ink.

What is claimed is:

1. In an ink composition suitable for ink jet printing on metal surfaces, the ink incorporating, in solution, a colorant, a resin component, an alcohol-water solvent and an electrolyte, proportioned to give the ink properties of low surface tension, low viscosity and a low resistivity, the improvement comprising the presence of ammonium formate as an electrolyte thereby preventing color degradation or mutation.

2. An ink composition suitable for use in jet printing operations consisting essentially of a solution of the following components:
   a. between about 1 and 17 weight percent of shellac, b. between about 0.5 and 5 weight percent of a basic dye,
c. between 0 and about 30 weight percent of a solvent modifier chosen from the group consisting of ethylene glycol monomethyl ether, ethylene glycol monoethyl ether, propylene glycol monomethy ether and propylene glycol monoethyl ether,
d. ammonium formate in an amount between 0.05 and about 2 weight percent,
e. the remainder of said ink consisting of a blend of water and a lower aliphatic monohydric alcohol of no more than three carbon atoms, in a water-to-alcohol ratio of between 1 to 1.5 and 1 to 10, the proportions of said water and alcohol within such limits being such that said ink has a surface tension at 68° F. of between about 22 and 40 dyne cm., a viscosity at 68° F. of between about 1.75 and 25 cps., said ink having a pH of between 8.0 and 9.5 and a specific resistivity of less than 1000 ohm cm.

* * * * *